United States Patent [19]

Ammann et al.

[11] 3,857,700
[45] Dec. 31, 1974

[54] PYROMETALLURGICAL RECOVERY OF COPPER VALUES FROM CONVERTER SLAGS

[75] Inventors: Paul R. Ammann, Reading; Jang Ho Kim, Chelmsford, both of Mass.

[73] Assignee: Kennecott Copper Corporation, New York, N.Y.

[22] Filed: Mar. 5, 1973

[21] Appl. No.: 338,333

[52] U.S. Cl.............................. 75/74, 75/63, 75/72, 266/34 A
[51] Int. Cl............................................. C22b 15/00
[58] Field of Search............... 75/72, 74, 76, 63, 89, 75/24, 109; 266/34 A; 416/96; 266/34 C

[56] References Cited
UNITED STATES PATENTS

| | | | |
|---|---|---|---|
| 1,479,511 | 1/1924 | Parsons | 266/34 A |
| 1,544,048 | /1925 | Stout | 75/72 |
| 2,129,760 | 9/1938 | Greenawalt | 75/72 |
| 2,319,402 | 5/1943 | Hever | 266/34 A |
| 2,982,522 | 5/1961 | Hamilton et al. | 416/96 |
| 3,314,783 | 4/1967 | Zimmerley et al. | 75/24 |
| 3,432,289 | 3/1969 | Spitz et al. | 75/76 |
| 3,437,475 | 4/1969 | Themelis et al. | 75/76 |
| 3,506,435 | 4/1970 | Themelis et al. | 75/72 |
| 3,582,057 | 6/1971 | Beals | 75/34 L |
| 3,666,440 | 5/1972 | Kono et al. | 75/76 |
| 1,822,588 | 9/1931 | Fowler et al. | 75/72 |

*Primary Examiner*—Walter R. Satterfield
*Attorney, Agent, or Firm*—Kenway & Jenney

[57] ABSTRACT

Process for recovering copper from molten converter-type slags or other highly oxidized copper smelter slags containing 7–30 percent by weight of magnetite ($Fe_3O_4$). The magnetite in the slag is reduced with carbonaceous materials or other solid reductants. While the slag is mixed with a water cooled, metal-bladed mechanical stirrer, the reductant is reacted with the slag. As a result of stirring the reductant into the slag, the rate of magnetite reduction is highly accelerated. With the reduction, the copper separates into a copper phase as either immiscible copper, copper sulfide, or a copper-iron-sulfide matte, depending upon the initial composition of the slag.

Preferably, the reduction of the slag is accomplished in a multistage reactor with countercurrent flow of the slag and the copper plate. The result is an efficient transfer of the copper from the slag into a product phase containing a high weight percent of copper.

19 Claims, 10 Drawing Figures

PYROMETALLURGICAL RECOVERY OF COPPER VALUES FROM CONVERTER SLAGS

BACKGROUND OF THE INVENTION

In the conventional smelting of copper sulfide concentrates, there are two basic steps. The concentrate is smelted to produce a copper-iron-sulfide matte in a reverberatory-type furnace. The molten matte is then transferred to converters, where, in the first step of a batch operation, the iron sulfide is oxidized to yield sulfur dioxide and an iron oxide. The iron oxide is reacted with silica flux to form a slag. In a second step, the copper sulfide is oxidized to yield copper and sulfur dioxide. Because of the oxidizing potential of the system after the first step and the agitation of the system during converting, there is a significant concentration of copper in the converter slags of the first step which is nominally 1 to 5, but can be as much as 10, percent of the weight of the slag, depending upon practice and the slag blow.

In the traditional smelter, copper is recovered from the converter slag by returning the molten material back to the reverberatory furnace. There, the magnetite in the converter slag is reduced and converted with a silica flux addition to a ferrosilicate slag with the copper being decreased to 0.5 weight percent or less.

In recent years, there has been a move toward recovering copper from converter-type slags by milling and flotation. The term "converter-type slag" is intended to represent a slag that contains a high amount of magnetite ($Fe_3O_4$) and a low amount of silica. Such slags typically contain 7–30 percent magnetite and 20–30 percent silica ($SiO_2$). In connection with the foregoing percentages as used throughout this specification and claims, all percentages are in weight percent unless otherwise noted.

The milling-flotation process is used commercially in Japan. The chief advantage of the milling-flotation process is that a low silica flux can be used, and thus fuel requirements in the reverberatory furnace are lower than most other methods; and also this process reduces magnetite buildup in the reverberatory furnaces. The milling-flotation process produces a copper concentrate product and a finely ground iron oxide-silica tailing. It is not feasible to recover any other metal values from the tailings.

Copper has also been recovered from flash furnace slags in an electric furnace. By holding the slag in the molten state for a number of hours, copper can be separated into a matte which is subsequently returned to the converters.

Representative of the prior art is U.S. Pat. No. 3,506,435 to Themelis et al., entitled "Liquid-Liquid Extraction of Reverberatory and Converter Slags by Iron Sulphide Solutions." In the process disclosed in that patent, molten reverberatory or converter slag is charged to a converter which is half filled with molten iron sulfide. The system is blown with air or inert gas for a few minutes and the phases separated. Copper is extracted from the slag, which is discarded, and the process repeated until the sulfide matte builds up to 10 percent copper level at which point the matte is returned to the smelter. This process is a batch operation with mixing being accomplished by gas injection. Although the copper content of the slag may be reduced to 0.1 percent Cu, the process disclosed in this patent suffers from thermodynamic limitations. Indeed, it has been found that the iron-sulfide matte utilized in the process has limited effectiveness in reducing oxidized slag. Furthermore, product mattes of greater than 10 percent copper are not practical with this process. With this process, the distribution of copper between matte and slag is $$D_{Cu} \cong 10\%/0.2\% = 50.$$

Another patent representing the state of the art is U.S. Pat. No. 3,314,783 to S. R. Zimmerley et al., entitled "Process for the Recovery of Molybdenum Values from Ferruginous, Molybdenum-Bearing Slags." In the process disclosed in the Zimmerley et al patent, molten slag containing 0.3 percent molybdenum and 0.5 percent copper is reduced which results in the molybdenum and copper being concentrated in a metallic reduction product. Minor additions of sulfur are included in the reaction system to produce a brittle, metallic sulfide matrix for fine metallic particles. Although the process disclosed in the Zimmerley et al. patent represents a significant breakthrough in this art, that process is not as economical as the process of the present invention, particularly for slags containing low concentrations of copper. In addition, the Zimmerley et al. process, like most pyrometallurgical processes, is conducted in a single stage reactor.

An article by Bryk, P. et al., "Flash Smelting of Copper Concentrates," AIME, February 1958, discloses a process wherein copper in flash smelter slags is recovered by holding the slag in an electric furnace for several hours. Lime and coke are added, and copper settles into a matte. The furnace is quiescent and there is no agitation to enhance the extraction rate. Copper is reduced to 0.2 to 0.6 percent by controlling the reduction of FeO in the slag. The energy consumption is 130 kw hr/ton slag.

Another article is one by Pimenov, L. I. and Zyezev, L. I. entitled "Reduction Electrosmelting of Converter Slags from Nickel Production," Tsvetn. Metal. 38(1) (1965), pp. 34–36. In that process, converter slags from a nickel refinery are treated in a round, three electrode electric furnace. Converter type slags containing 0.37 percent Co, 1.03 percent Ni, 49 percent Fe, 29 percent $SiO_2$ were charged into the furnace. After treatment, the slag contained 0.1 percent Co and 0.05 percent Ni. The matte product contained 1.6 percent Co and 5.6 percent Ni, 64 percent Fe and 24.6 percent S. Yields were 72 percent Co and 93 percent Ni. The distributions between phases were:

$$D_{Co} = 1.6\%/0.097 = 16.5$$
$$D_{Ni} = 5.6/0.05 = 112$$

The slag reaction time is seven hours, the energy consumption 483 kw-hr/ton.

Another patent representative of the state of the art is U.S. Pat. No. 3,542,352 by Themelis et al., entitled "Apparatus for the Continuous Smelting and Converting of Copper Concentrates to Metallic Copper." In the process disclosed in this patent, as part of continuous copper smelter, there is a slag cleaning section of the furnace which is an unbaffled open vessel. In this process, there is countercurrent flow of matte and slag.

In short, in the most widely used prior art processes, copper is recovered from slags by either returning the slag to the reverberatory furnace to allow the copper to settle; or cooling, grinding and floating the slag; or settling the copper in an electric furnace. Each of the foregoing methods suffers from one or more deficiencies which are significantly reduced in the process of the present invention.

SUMMARY OF THE INVENTION

The recovery of copper from slags containing significant amounts of magnetite is accomplished in accordance with the present invention by mixing a solid carbonaceous material into the slag with a water cooled, metal-bladed mechanical stirrer to reduce the magnetite and copper oxide content of the slag.

The foregoing enables a more economic means for recovering copper from converter slags and permits an increase in productivity in the smelter. The foregoing also enables the recovery of molybdenum and other valuable non-ferrous metals from the decopperized slags.

Accordingly, it is an object of the present invention to provide an improved process for recovering copper values from slags containing significant amounts of magnetite.

Another object of the invention is to provide a process for recovering copper values from converter slags in which the converter slag is reduced and thereafter mixed with an iron-sulfide matte to extract the coper values in the slag into the matte.

It is yet another object of the present invention to provide a process wherein slag is treated in a single or multistage reactor which is mixed by a water cooled, metal-bladed mechanical stirrer to increase the amount of contact between the reductants and the slag.

DESCRIPTION OF THE PREFERRED EMBODIMENTS

Figure 1:
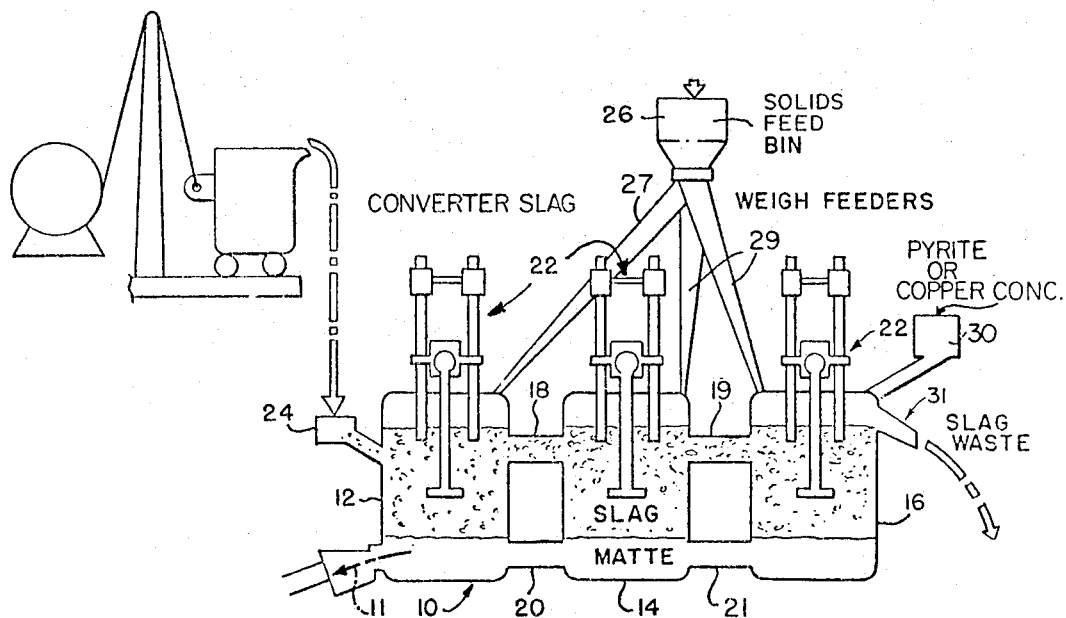
FIG. 1 is a schematic diagram illustrating the pyrometallurgical treatment of converter slag in accordance with the present invention.

At the outset, the invention is described in its broadest overall aspects with a more detailed description following.

Copper is present in highly oxidized slag in two forms: (1) entrained metal and sulfides, and (2) soluble (oxidized) copper. In prior art single stage reactors, the products (nonslag or copper phase) typically contain 5 to 10 percent copper, while the slag waste contains 0.1 to 0.5 percent of this metal value. In the present process, it is possible to clean slags to 0.1 to 0.5 percent concentration of metal (copper) while producing a copper phase or product phase containing 20 to 80 percent of the metal as a matte or metal or alloy, depending on the distribution between phases and the number of furnace reactors.

The soluble copper content is related, thermodynamically to the oxygen potential of the slag. To lower the copper to an acceptably low level of 0.5 weight percent or less, the slag must be chemically reduced. In the present invention, this is accomplished by reduction with a carbonaceous material (coal, coke, etc.). Since carbonaceous materials "float" on molten slag, its reduction effectiveness is poor unless it is forced into the molten material. Thus, it is a further aspect of this invention that the carbonaceous material is worked into the molten slag by a water cooled, metal-bladed mechanical stirrer.

If the reduction is conducted in a single furnace, copper can be extracted; however, the product grade may be low. Preferably, the reactor system should be staged to achieve a high recovery of copper and a high grade copper product.

The pyrometallurgical recovery of copper from molten, high magnetite slag is based upon chemical reduction. The solubility of copper is decreased as the $Fe_3O_4$ (oxygen potential) is reduced below 5 weight percent.

High magnetite slags are complex with respect to contained copper which is a combination of entrained metal and sulfide and dissolved copper. In conventional converter slags, the copper content and composition varies throughout the converter cycle, and entrained copper is a function of converter operating practice. Slags from converters, flash furnaces and Noranda furnaces vary in composition of iron, $Fe_3O_4$, silica and copper. Typical values are presented in Table 1 below. In general, silica content will vary from 20 to 29 percent and magnetite from 15 to 25 percent.

TABLE 1

Compositions of Typical High Magnetite Slags in Weight Percent

| Type of Slag | Converter | Flash Furnace | Noranda Furnace |
|---|---|---|---|
| Copper | 4 – 3 | 1 – 1.5 | ~12 |
| Silica | 20 – 29 | 29 – 30 | 22 – 24 |
| Iron-Total | 46 – 49 | 44 – 46 | ~36 |
| Magnetite | 20 – 25 | 10 – 13 | 20 – 25 |
| Sulfur | — | — | ~1 |

Copper solubility in slag is related to the oxygen potential of the slag, as represented by Equation 1.

$$2\ Cu\ (l) + Fe_2O_3(l) = Cu_2O\ (l) + 2\ FeO\ (l)$$

(1)

The equilibrium for the reaction is defined as

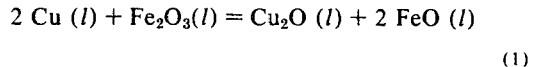

(2)

Thus, at any temperature, the activity of copper in the slag ($Cu_2O$) is determined by the activity of copper in the insoluble copper or matte and the activities of FeO and $Fe_2O_3$. The latter are in turn a function of the silica content of the slag. The activity of $Fe_2O_3$ is related by $$Fd_2O_{3(l)} = 2FeO_{(l)} + 1/2\ O_2 \tag{3}$$

$$2Fe_2O_3 = Fe_3O_4 + FeO \tag{4}$$

$$C_{Cu} = kX_{Cu}{}^a \cdot C^b_{Fe_3O_4} \tag{5}$$

Thus, the content of dissolved copper in the slag is related to the concentration of magnetite in the slag ($C_{Fe_3O_4}$) and copper in the matte ($X_{Cu}$). The high concentrations of soluble copper is high magnetite slags are a result of the oxygen potential and the matte grade. Correspondingly, it is necessary to reduce the oxygen potential through chemical reduction, and the matte grade in order to remove copper from molten converter slag.

The magnetite and copper oxide can be reduced either by carbon (e.g., coal or coke) or labile sulfur from pyrite or copper concentrate. The equilibrium product compositions have been computed for carbonaceous reduction and pyrite or concentrate reduction.

Carbon will reduce slag magnetite producing either carbon monoxide or carbon dioxide, according to the following equations:

$$Fe_3O_{4(l)} + C_{(s)} = 3\ FeO_{(l)} + CO_{(g)} \tag{6}$$

$$Fe_3O_{4(l)} + 1/2C_{(s)} \times 3FeO_{(l)} + 1/2Co_{2(g)} \tag{7}$$

If the product gases are in equilibrium with the slag, the equilibrium composition can be predicted by Equation 8.

$$Fe_3O_4 + CO = 3FeO + CO_2 \tag{8}$$

The free energy for the reaction has been calculated at 1127°, 1227° and 1327°C and the results are presented below in Table II.

TABLE II

Equilibrium Calculations for Reduction of Magnetite

| Item | Free Energy of Formation (kcal/mole $Fe_3O_4$) | | |
|---|---|---|---|
| | 1400°K | 1500°K | 1600°K |
| Products | 1127°C | 1227°C | 1327°C |
| $CO_2$ | − 94.72 | − 94.73 | − 94.74 |
| $3FeO(l)$ | −127.80 | −124.38 | −120.99 |
| Reactants | | | |
| CO | − 56.19 | − 58.24 | − 60.28 |
| $Fe_3O_4(S)$ | −160.60 | −153.5 | −146.35 |
| Reaction | − 5.73 | − 7.37 | − 9.10 |
| $K_{tt}=e^{-\{\Delta F/RT\}}$ | 7.82 | 11.8 | 17.42 |

The ratio of $Co_2$ to CO can be estimated from the equilibrium constant and the activities of $Fe_3O_4$ and FeO, respectively, according to:

$$P_{Co_2}/P_{co} = K_8[a_{Fe_3O_4}/a^3_{FeO}] \tag{9}$$

Depending upon the concentration, the activity of magnetite may vary from unity (saturation) to 0.1 (i.e., approximately 10 weight percent in slag). The activity of FeO will vary correspondingly from 0.6 to 0.4. The ratio of $Co_2$ to Co has been calculated for a slag containing 25 weight percent $SiO_2$ and 10 to 30 weight percent $Fe_3O_4$ and is presented below in Table III.

TABLE III

Estimated Equilibrium Ratio of $CO_2/CO$ in Reduction Gases

| $Fe_3O_4$ (wt. %) | $a_{Fe_3O_4}$ | $a_{FeO}$ | $[a_{Fe_3O_4}]/a^3_{FeO}$ | 1127°C | $[P_{Co_2}/P_{Co}]$ 1227°C | 1327°C |
|---|---|---|---|---|---|---|
| 30 | 1.0 | 0.4 | 15.6 | 122 | 184 | 272 |
| 20 | 0.5 | 0.47 | 4.8 | 37.5 | 56.6 | 84 |
| 15 | 0.2 | 0.55 | 1.2 | 9.4 | 14.2 | 20.9 |
| 10 | 0.1 | 0.60 | 0.46 | 3.6 | 5.4 | 8.0 |

These calculations indicate that throughout the reduction, $CO_2$ is the predominant gas product. (In these calculations, it is assumed that there is no solid carbon in the system—which in fact there would be—to reduce $Co_2$ to CO.)

The energy required for the carbothermic reduction of slag is a function of $CO_2$ produced.

The primary criterion for a pyrometallurgical slag treatment process is high recovery of copper; that is, the cleaned slag should contain less than 0.5 weight percent copper. It is also desirable to produce a high grade copper product or copper phase.

In a single furnace, it is theoretically possible to achieve a low copper slag product, provided the magnetite is reduced to less than 5 weight percent. To allow for losses by entrainment, it is preferable to produce a matte containing less than 40 percent copper.

It is possible, however, to achieve high copper recoveries while producing a high percent copper containing product or phase (greater than 60 weight percent copper) in a multistaged furnace-reactor system where slag flows sequentially through two or more furnaces and then is removed from the system. In such a multistage system, pyrite, or copper concentrate, is added to the final stage and is moved counter to the slag being enriched in copper.

The embodiment of the present invention wherein slag and a matte contact each other in a countercurrent manner is best shown in FIG. 1. To accomplish such countercurrent contact, a multistage reactor 10 is used. Although three reactors 12, 14 and 16 are shown in FIG. 1, as is apparent, two reactors can be utilized, or, indeed, more than three reactors can be utilized. Reactors 12, 14 and 16 are connected in series by upper conduits 18, 19 and lower conduits 20, 21. As is shown in FIG. 1, lower conduits 20, 21 allow a flow of matte from one reactor to another whereas upper conduits 18, 19 allow a flow of slag from one reactor to another. It is preferable to stir the contents of the reactor with a stirrer assembly 22. Stirrer assembly 22 may be a water cooled mechanical stirrer having metal blades as is disclosed in a U.S. Pat. application Ser. No. 338,328, filed on Mar. 5, 1973, entitled "Pyrometallurgical System with Fluid Cooled Stirrer," by Paul R. Ammann et al., the teachings of which are incorporated herein by reference.

Converter slag is introduced into slag treatment reactor 10 by being poured into a launder 24 located on reactor 12. The carbonaceous material in reactor 10, such as coal and coke, are added to reactor 10 by means of a feed bin 26 which has launders 27, 28 and 29 which distribute materials equally to reactors 12, 14 and 16. A hopper 30 is also provided in order to introduce iron pyrites on copper concentrate into reactor 16. The three slag treatment reactors 12, 14 and 16 connected in series were determined to provide high copper yields and overall process flexibility.

The slag treatment product, or copper phase, represented by arrow 11, is drawn off separately from the slag.

Figure 2:
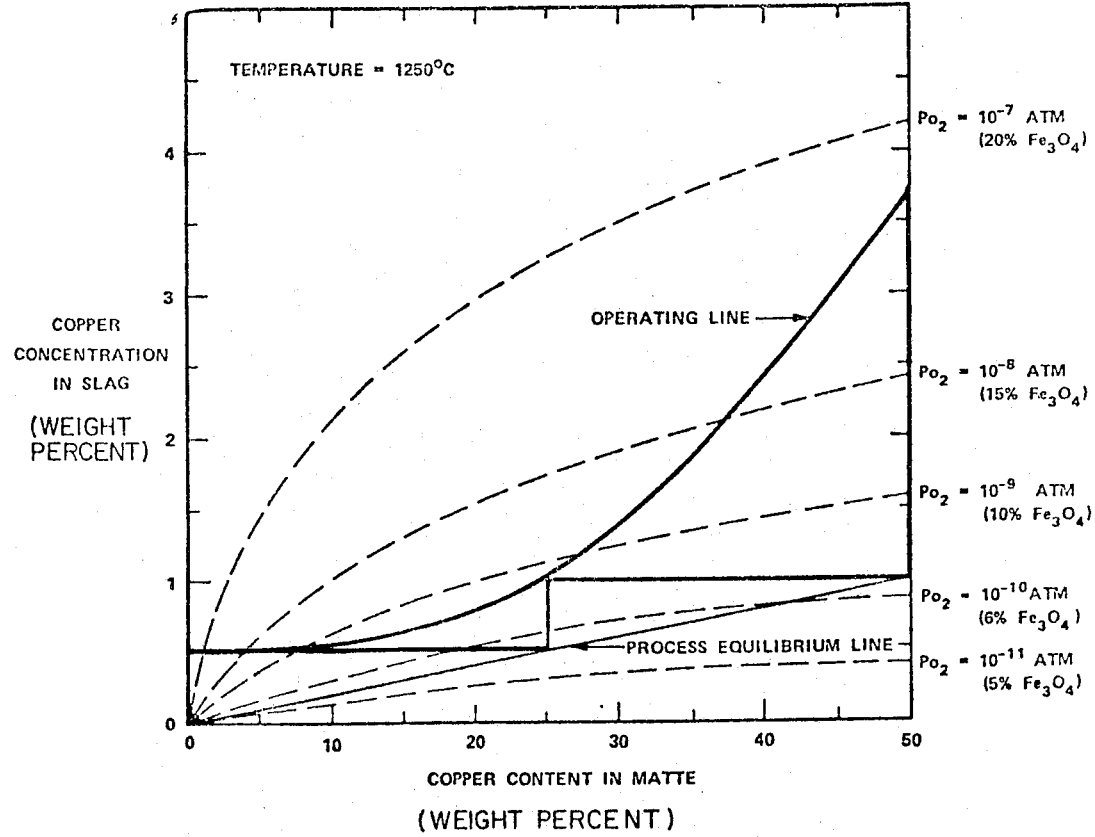
FIG. 2 is an operating diagram for a two stage pyrometallurgical process to decopperize converter-type slags.

At this point, it should be noted that the process of the present invention is based on the fact that iron sulfide has an affinity for copper. The foregoing is graphically shown by FIG. 2 in which the copper concentration in the slag is in equilibrium with the copper concentration in the matte and is shown to be dependent upon the concentration of $Fe_3O_4$ in the slag. Stated another way, the lower the concentration of $Fe_3O_4$ in the slag, the lower will be the concentration of copper in the slag.

Reduction can be effected with any known reducing agent such as carbon containing materials or iron, it being preferred to employ carbon containing materials since they are relatively inexpensive. It is essential, however, that the slag be admixed during carbon addition to prevent carbon flotation and $Fe_3O_4$ settling.

Figure 3:
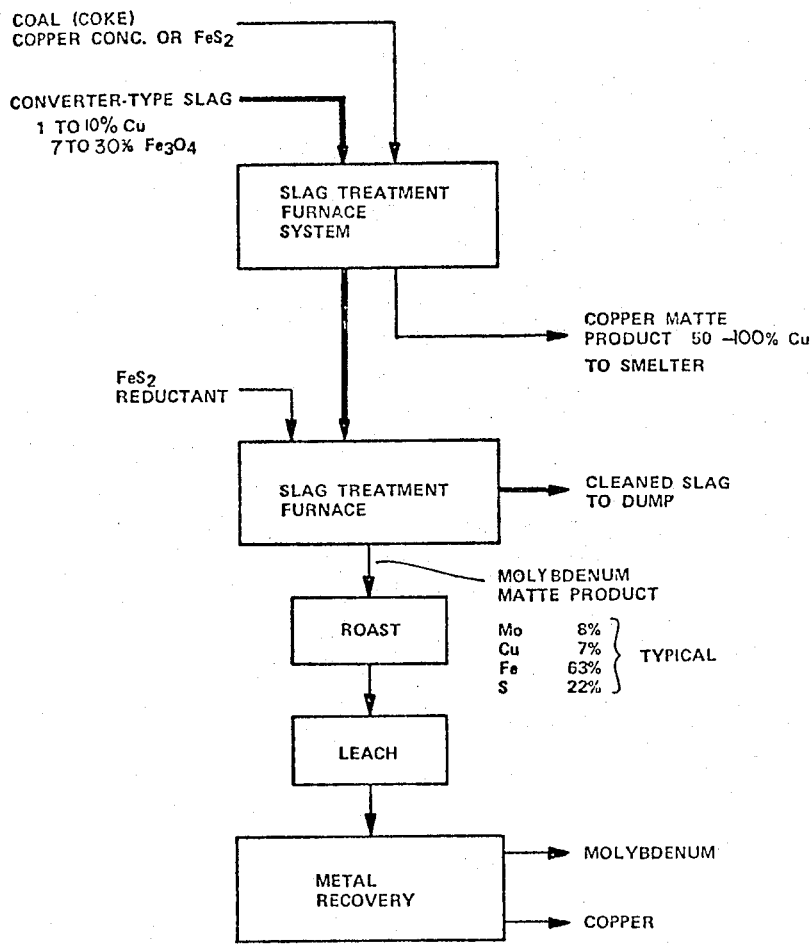
FIG. 3 is a flow sheet for combined recovery of copper and molybdenum from converter-type slags.

In short, the process of the present invention includes mixing a reductant into the slag to reduce it in order to extract the copper values therefrom as copper, copper sulfide or a copper-sulfide matte. Reduction and extraction can be accomplished at any temperature above the slag melting point (1050°C), however, treatment at 1200°–1250°C is preferred. A major advantage of pyrometallurgical slag treatment in accordance with the present invention over milling and flotation is that subsequent recovery of molybdenum is possible. The overall process wherein copper and molybdenum is recovered from converter-type slags is shown schematically in FIG. 3. In this combined process, the plant is arranged in two sections: in the first section, a high percent copper product or phase is produced in accordance with the present invention; and in the second section, a molybdenum matte product is obtained by the process disclosed in a copending Pat. application Ser. No. 338,197, filed on Mar. 5, 1973 entitled "Process for Recovering Non-Ferrous Metal Values from Reverberatory Furnace Slags" by P. R. Ammann et al., the teachings of which are incorporated herein by reference. As is disclosed in that application, the molybdenum is recovered from the sulfide by roasting, leaching and metal recovery.

To illustrate many of the points set forth above, pilot experiments were conducted. The objective of the pilot experiments was to confirm the theory of the present invention by measuring rate and extent of copper separation from converter slags. The overall rate and extent of copper separation is determined by the following steps.

1. Coalescence and settling of entrained metal and matte.
2. Reduction of magnetite.
3. Reduction of copper and extraction into matte.

From these experiments, it was concluded that the well-stirred reactor furnace provides accelerated rates for all three steps to result in a better overall recovery of copper. The electrical furnace used in the experiments was the pilot furnace described and disclosed in the copending patent application entitled "Pyrometallurgical System with Fluid Cooled Stirrer" referred to above.

The furnace consisted of a steel-plate box 3.2 feet wide by 3 feet long and 5 feet high. A crucible approximately 15 inches in diameter and 2 feet deep was formed with castable refractory. The furnace was heated by two horizontal rows of heating elements with a maximum power input of 80 kw. (This method of heating was chosen over an electric arc in order to avoid chemical reduction by carbon electrodes.) A 6 inch diameter, three bladed mechanical stirrer was installed through the furnace top. The water cooled copper stirrer could be raised and lowered in the furnace and rotated at speeds of between 0–350 rpm. A solid coating of slag was formed on the blades and shaft of the stirrer immediately upon contact with the molten slag.

The furnace was initially charged with 60 to 100 pounds of slag. After this slag was remelted, further additions were made. When the bath level reached the stirrer, the rate of addition and melting could be increased considerably. Normally 3 to 4 hours were allowed to completely remelt 250 pounds of slag. The entry of air into the furnace was minimized by a constant flow of nitrogen through the pour spout.

Two tons of crushed converter slag obtained from the first and last skims of a converter cycle were used in the experiments. In some experiments, a reduced slag was reoxidized to a desirable magnetite content to eliminate a long reheating period. At the appropriate times, coal was added for reduction, and pyrite or pyrrhotite was charged to control the matte composition. The stirrer was immersed into molten slag approximately 4 inches above the bottom of the crucible and the speed adjusted to the desired rate throughout all experimental periods. A small quantity of charcoal or coal was maintained on the bath surface to prevent any oxidation of the slag. Foaming has never been a serious problem except with converter slag containing more than 35 percent magnetite.

Samples were taken in two different ways. One method was core samping using a chilled iron rod and the other was the bucket sampling using a fire clay crucible scooping from melt. The core sampling method could indicate copper concentration gradients with slag depths, but it is often provided erroneous magnetite concentrations. The copper concentration gradient through depth of melt bath was not significant in most experiments. The bucket sampling technique was employed in all experiments, unless otherwise indicated. Samples were ground to minus 400 mesh and x-ray spectroscopy was used to determine Cu, S, Fe and $SiO_2$ content. Magnetite content was determined by the standard acid dissolution technique.

Several experiments were performed to determined the rate of magnetite reduction, copper reduction, and copper settling. Important process parameters which influence these rates are: (1) effect of agitation - reduction and settling, and (2) effect of reductants (coal, sulfides). These parameters are described below.

1. Effect of Agitation on Reduction Rate

Figure 4:
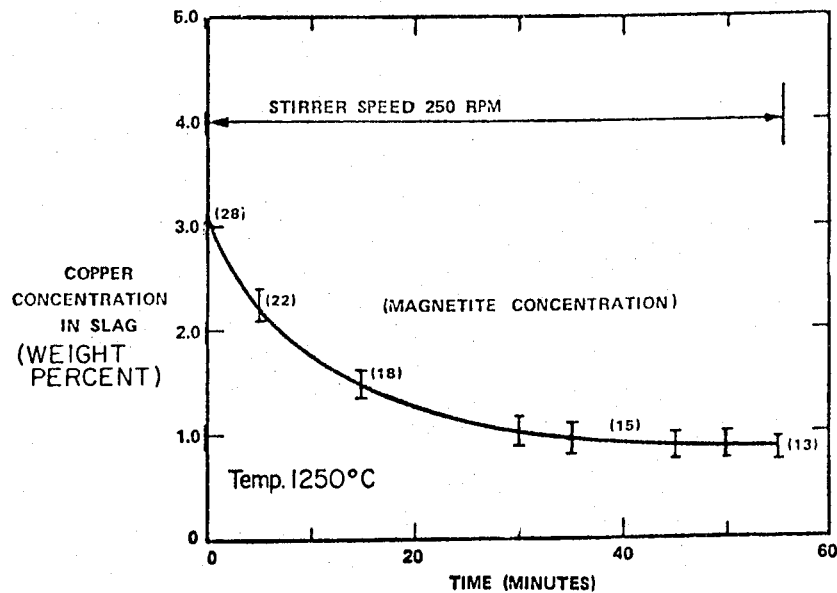
FIG. 4 is a graph showing a typical reduction of magnetite and copper from converter slag.
Figure 5:
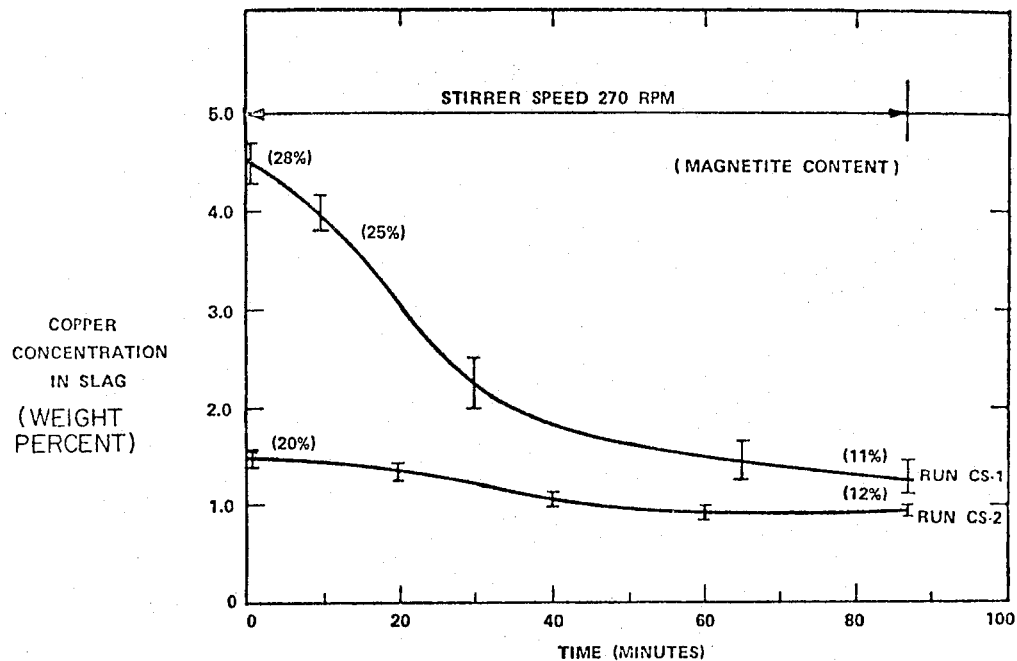
FIG. 5 is another graph showing the reduction of copper and magnetite from converter slags in accordance with the present invention.

Typical examples of magnetite reduction and copper extraction are shown in FIGS. 4 and 5. Magnetite is reduced from 28 weight percent to 11–13 weight percent while the copper content in slag is decreased to 1–0.8 percent. Copper contained in slag is attributed to both entrainment and dissolution. The copper concentration in the slag is shown to follow closely magnetite reduction in experiments.

Figure 6:
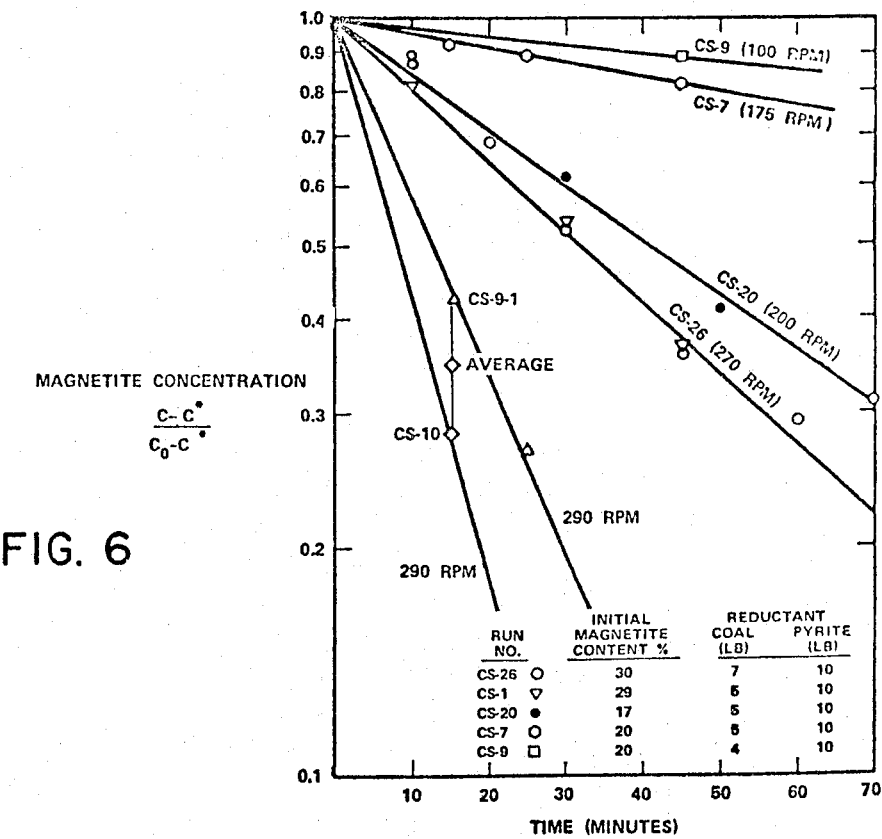
FIG. 6 is a graph showing the magnetite reduction rate as a function of stirring speed.

A sufficient quantity of coal to reduce ferric oxide in slag to iron saturation was always present in the reactor. Equilibrium ferric concentration at the interface of individual carbon particle is defined as approximately 7 percent $Fe_3O_4$ in converter-type slag at 1200°C. The relative oxidation state of slag is defined as follows:

$$C - C^*/C_o - C^*$$

where $C$ = bulk magnetite concentration at a time $t$, $C_o$, initial bulk magnetite concentration, and $C^*$ equilibrium magnetite concentration in iron saturated slag. As shown in FIG. 6, the experimental data is well correlated by a first order reaction kinetics with the reduction rate of magnetite in slag increasing with stirrer speed. Above 280 rpm, magnetite is reduced to iron saturation (7 percent $Fe_3O_4$) within 1 hour.

Within experimental error, the magnetite reduction rate constant is correlated with stirrer speed (rpm) as follows:

$$k(Min^{-1}) = (1.4 \pm 0.5) \times 10^{-3} [RPM/100]^{(3\pm0.9)}$$

Visual observation on agitated slag indicates that an intensive vortex is normally formed surrounding the shaft of stirrer, and coal particles start to move into slag bath when the stirrer speed exceeds 200 rpm.

2. Effect of Reductants

Coal (or coke) and pyrite (or sulfide) are considered to be good reductants for magnetite in fayalite slag. The addition of pyrite with coal increases the magnetite reduction slightly. A coal addition factor is defined as the ratio of the actual quantity of coal addition to the stoichiometrically required quantity of coal.

Several experimental runs were made in order to study the effects of the ratios of coal and sulfide to slag on the reduction and extraction of magnetite and copper, respectively. The data are summarized in Table IV below.

The kinetic constants increase with stoichiometric ratio of coal to slag. This finding indicates that the reduction rate can be optimized by covering the slag bath with coal. A threefold increase in rate was achieved by using 10 times the stoichiometric amount of coal.

Since the concentration of $SiO_2$ in slag affects the activities of iron oxides, runs were made to measure the rate of magnetite reduction at several silica levels. Two slags of 25 percent and 30 percent $SiO_2$ were reduced to 12 percent $Fe_3O_4$ by similar quantities of coal and pyrite at 250–260 rpm. Reduction rate of these two slags was found very similar within the limits of experimental error.

Theoretically, the concentration of copper in slag can be decreased to less than 0.3 weight percent if the oxidation potential of the slag is decreased to $10^{-11}$ atmospheres (7 percent $Fe_3O_4$ - iron saturation). However, it may not be practical or desirable to reduce the oxidation level below 7 to 12 weight percent $Fe_3O_4$, in which case the slag contains over 0.5 weight percent soluble copper in contact with high grade mattes. Moreover, there is mechanical entrainment of matte in the slag which adds to the copper content of the slag. The high rates of mechanical stirring which are essential for rapid reduction of the iron oxides by coal or coke, generate fine dispersions of matte in slags, and in a commercial process it is essential that this matte be separated from the slag efficiently and rapidly. Experiments were conducted to determine the conditions necessary for rapid coalescence and settling of entrained copper. In a molten slag depth of 1 foot, copper settles down to 0.5 weight percent within 10 minutes at 5–60 rpm after reduction at 200 rpm.

In a number of experiments, it was shown that after reduction at stirrer speeds of 150 to 300 rpm, the copper content of the slag could be 1 to 2 weight percent, but by decreasing the stirrer speed to 50 rpm, the cop-

TABLE IV

Summary of Magnetite Reduction Run Conditions

| Run No. | CS-22 | CS-28 | CS-26 | CS-27 | CS-19 | CS-21 | CS-20 | CS-18 |
|---|---|---|---|---|---|---|---|---|
| Stirrer Speed (RPM) | 250 | 250 | 270 | 250 | 240 | 230 | 200 | 210 |
| Coal Added++ (lbs.) | 5 | 5 | 7 | 5 | 5 | 5 | 5 | 5 |
| Pyrite (lbs.) | 34 | 5 | 10 | 10 | 2* | 10** | 10 | None |
| Initial Magnetite Content (%) | 13 | 17 | 30 | 27 | 15 | 10 | 17 | 18 |
| Slag Quantity (lbs.) | 225 | 250 | 250 | 250 | 225 | 225 | 250 | 250 |
| Stoichiometric+ Ratio of coal addition | 3.7 | 2.5 | 1.1 | 1.0 | 2.7 | 10 | 2.5 | 2.5 |
| Rate Const. (Min$^{-1}$) | 0.056 | 0.030 | 0.021 | 0.021 | 0.030 | 0.056 | 0.017 | 0.013 |

Figure 7:
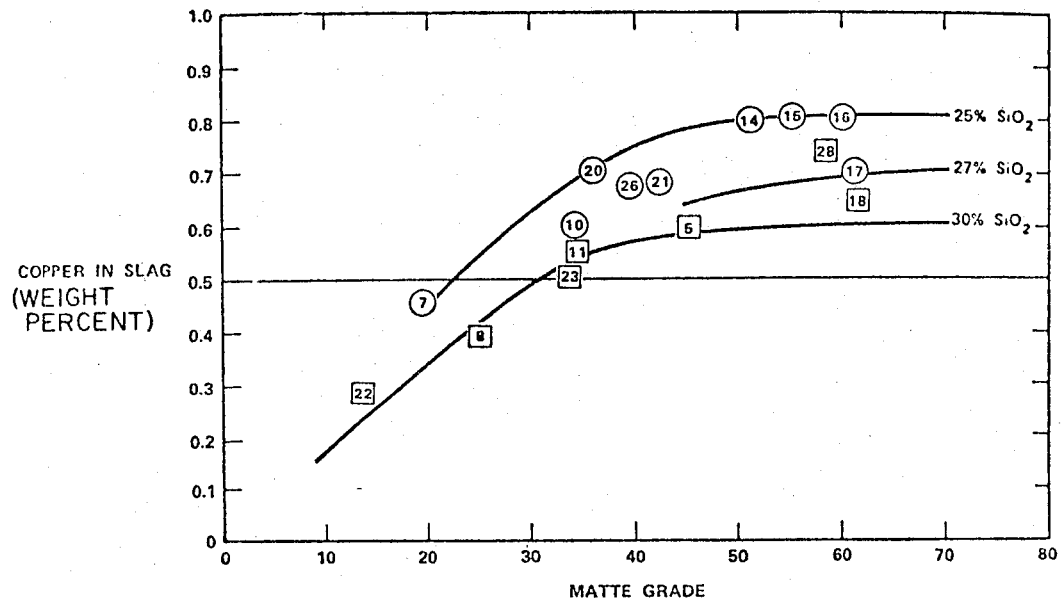
FIG. 7 is a graph showing the effect of matte grade and silica concentration on copper content in slag.

+ Ratio of total coal used to stoichiometric requirement.
++ Coal contains 52 percent fixed carbon.
* Addition as FeS.
** Addition as copper concentrate.

per level would drop to a "quasi-equilibrium" value in 5 to 15 minutes. This "equilibrium" value was found to be a function of both the matte grade and the silica concentration of the slag, as shown in FIG. 7. The data pertinent to FIG. 7 is set forth in Table V below.

TABLE V

Slag Composition (weight percent)

| RUN | $Fe_3O_4$ | $SiO_2$ | S |
|---|---|---|---|
| 7 | 13 | 24 | 4 |
| 8 | 10 | 30 | 3 |
| 10 | 7 | 31 | 1.5 |
| 11 | 9.5 | 31 | 1.5 |
| 14 | 11 | 25 | 1.7 |
| 15 | 13 | 25 | 1.5 |
| 16 | 15 | 25 | 1.4 |
| 17 | 12.7 | 26 | 1.1 |
| 18 | 12.5 | 29 | 0.7 |
| 20 | 8.5 | 25 | 2.6 |
| 21 | 7 | 27 | 2.0 |
| 22 | 7 | 30 | 2.6 |
| 23 | 14 | 29 | 1.7 |
| 26 | | | |
| 28 | 9 | 29 | 1.1 |

The data indicates that with product matte grades over 35 percent, the "quasi equilibrium" copper concentration is 0.6 to 0.8 weight percent at 30 and 25 percent silica slags, respectively.

Since the direct reduction of converter slags separates copper as a high matte grade product (nominally greater than 40 percent copper), it is necessary to provide a pyrite or copper concentrate "wash" to reduce the copper to 0.5 weight percent or less. Thus, pyrite or copper concentrates may be added to reactor 16 through launder 30 (see FIG. 1). The data in FIG. 7 shows that depending upon the silica content of the slag, a sulfide wash producing a matte grade less than 25 weight percent copper can decrease the copper in the slag (soluble and entrained) to less than 0.5 weight percent. In short, a pyrite or copper concentrate wash is essential to achieve acceptable slags containing less than 0.5 weight percent copper.

The process of the present invention wherein a single stage reactor is used to treat slag is further illustrated by the following non-limiting example. To calculate the material and energy balances and to size the reactor, the following assumptions are made:

1. The magnetite is reduced by carbonaceous material (e.g., coal),
2. The product gases contain equal concentrations of CO and $CO_2$, the product mixture, which is in equilibrium with 8 weight percent magnetite in the slag,
3. The temperature of the slag is fed continuously at 1250°C and the furnace operates at 1250°C,
4. Copper concentrate, $CuFeS_2$, is added to increase the sulfur content of the slag from 1 weight percent to 2.1 weight percent. (This is equivalent to 6.3 weight percent of the slag added as $CuFeS_2$ or 4.4 weight percent added as $FeS_2$.)

Figure 8:
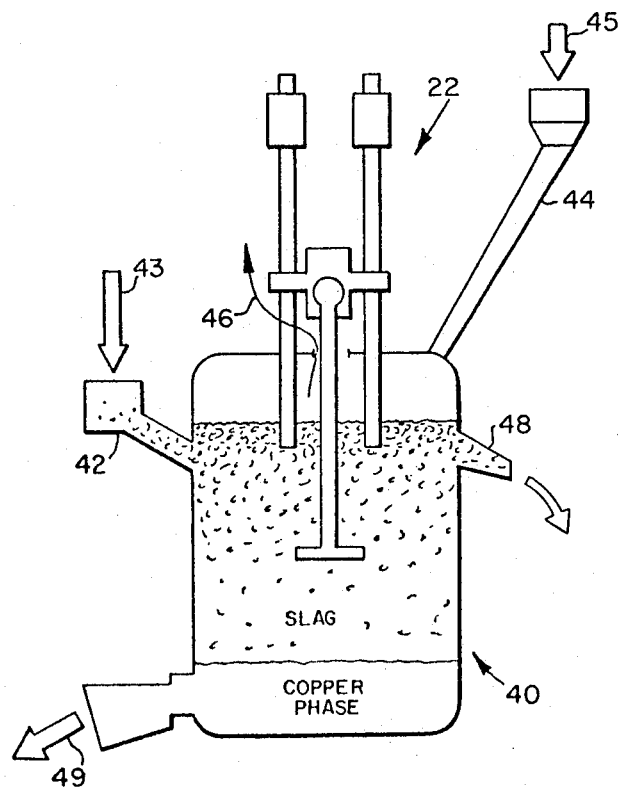
FIG. 8 is a schematic diagram illustrating a single stage pyrometallurgical treatment of converter slags in accordance with the present invention.

The material balances appearing in the tables below relate to a single stage reactor 40 (see FIG. 8) and are based on 100 tons of slag feed. The slag is introduced into reactor 40 through a hopper 42 as is shown by arrow 43. The approximate composition of a 100 ton slag feed in tons is set forth in Table VI below.

TABLE VI

| | Tons |
|---|---|
| $Fe_3O_4$ | 25 |
| FeO | 46 |
| $SiO_2$ | 25 |
| Cu | 3 |
| S | 1 |

Coal is introduced through hopper 44 as is shown by arrow 45. For a 100 ton slag feed, 2.0 tons of coal with a carbon content of 1.6 tons is used. The coal would contain 0.2 tons of water.

The coal and the slag are mixed with stirrer 22 (about 250 rpm) to reduce the magnetite content of the slag. The matte is produced from the copper concentrate which is added through hopper 44 into the reactor 40 while the stirrer is rotated at 250 rpm. To treat 100 tons of slag feed, the $CuFeS_2$ content of the copper concentrate should amount to 6.3 tons. While the slag is being treated, off gases result which leave the reactor through the opening through which stirrer assembly 22 protrudes, as is shown by arrow 46. The composition of the off gases, in moles, is set forth in Table VII below.

TABLE VII

| Component | Moles/per 100 tons of feed |
|---|---|
| CO | 49 |
| $CO_2$ | 49 |
| $S_2$ | 17 |
| $H_2O$ | 100 |

Treated slag is drawn off through a spout 48. The resulting composition of 100 tons of treated slag, in tons, is set forth in Table VIII below.

TABLE VIII

| Component | Tons |
|---|---|
| $Fe_3O_4$ | 8.0 |
| FeO | 62.2 |
| $SiO_2$ | 25.0 |
| Cu | 1.0 |
| S | 2.0 |

The composition of the resulting matte which is drawn off from the bottom of reactor 40, as is indicated by arrow 49, is set forth in Table IX below.

TABLE IX

| | Tons | Weight Percent |
|---|---|---|
| Cu | 5.46 | 69.2 |
| Fe | 1.0 | 12.2 |
| S | 1.44 | 18.2 |
| | 7.90 | |

In accordance with this embodiment of the invention, the magnetite in the slag is reduced from 25 to 8 weight percent, and the amount of copper in the slag is reduced from 3 to 1 weight percent. The final copper value includes both soluble and entrained copper. Theoretically, the reduction requires 1,200 pounds of carbon, or 0.6 tons of coal, but 2 tons of coal are provided to allow for some burnup due to infiltration of air and to insure a reducing potential. To saturate the slag with sulfur and provide some dilution of the matte, approximately 7.6 tons of copper concentrate are added to the furnace; the matte product contains 69 percent copper. The $CO - CO_2$ component in the off gas are in chemical equilibrium with the magnetite in the slag.

The following non-limiting example illustrates the embodiment of the present invention wherein slag is treated in a multistage reactor. In one case, approximately 1560 tons of slag per day having the composition as set forth in Table X below is added to reactor 12 through hopper 24 (see FIG. 1).

TABLE X

|  | Cu | S | Mo | FeO | $Fe_3O_4$ | SiO |
|---|---|---|---|---|---|---|
| Tons per day | 170 | 17 | 6.3 | 515 | 390 | 376 |
| Percent | 11 | 1.0 | 0.4 | 33 | 25 | 24 |

The slag flows through reactors 12, 14 and 16 in series. While being treated in reactors 12, 14 and 16, the slag is continuously mixed by stirrer 22 (250 rpm) and the slag is maintained at a temperature of 1250°C. During the flow through these reactors, magnetite in the slag is reduced and soluble copper (CuO) is reduced and extracted as $Cu_2S$ along with entrained metal. During the reaction, iron sulfide and coal is added to reactors 12, 14 and 16 through feed bin 26. The iron sulfide added through bin 26 must be sufficient to yield 79 tons of iron per day and 91 tons of sulfur per day; 45 tons of coal containing 50–80 percent carbon should be utilized to reduce the magnetite level of the slag. The slag which is drawn off at spout 31 has the composition set forth in Table XI below.

TABLE XI

|  | Cu | S | Mo | FeO | $Fe_3O_4$ | SiO |
|---|---|---|---|---|---|---|
| Tons per day | 8 | 44 | 6.3 | 830 | 70 | 376 |
| Percent | 0.5 | 3.1 | 0.4 | 58 | 5 |  |

With 1560 tons of slag feed per day being treated, 1425 tons of slag per day having the composition set forth in Table XI can be produced.

The slag leaving reactor 16 through spout 31 can be further treated in the same manner with 53 tons of iron sulfide per day and 16 tons of coal per day in a separate vessel to produce 1415 tons of slag having the composition set forth in Table XII below and a matte having the composition set forth in Table XIII below.

TABLE XII

|  | Cu | Mo | FeO |
|---|---|---|---|
| Tons per day | 5 | 0.65 | 895 |
| Percent | 0.3 | 0.04 | 63 |

TABLE XIII

|  | Mo | Cu | Fe | S |
|---|---|---|---|---|
| Tons per day | 5.7 | 3 | 25 | 14.5 |
| Percent | 13 | 6 | 51 |  |

The matte set forth in Table XIII may be further treated pyrometallurgically to recover molybdenum and copper values. The matte leaving reactor 12, as shown by arrow 11, has the composition set forth in Table XIV below.

TABLE XIV

|  | Cu | Fe | S |
|---|---|---|---|
| Tons per day | 16.2 | 44 | 25 |
| Percent | 70 | 19 | 11 |

This matte may be recycled back to the converter furnace.

Figure 9:
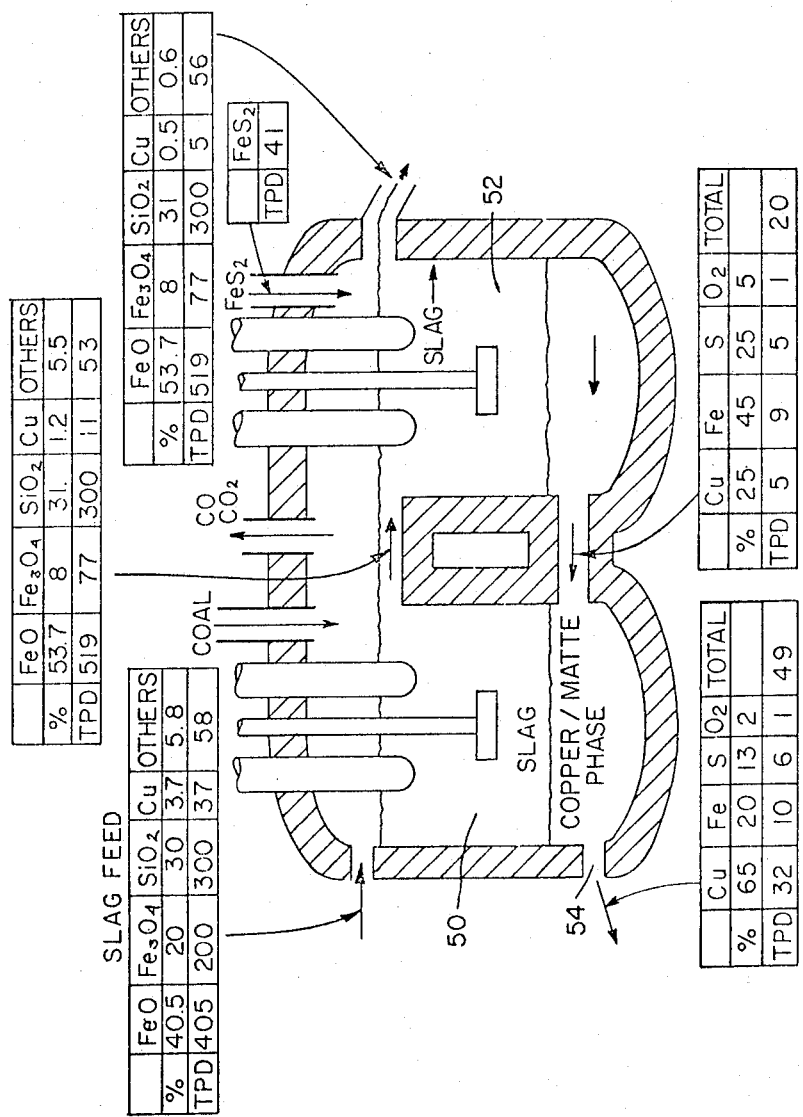
FIG. 9 is a schematic flow sheet for a two stage reactor in accordance with the present invention.
Figure 10:
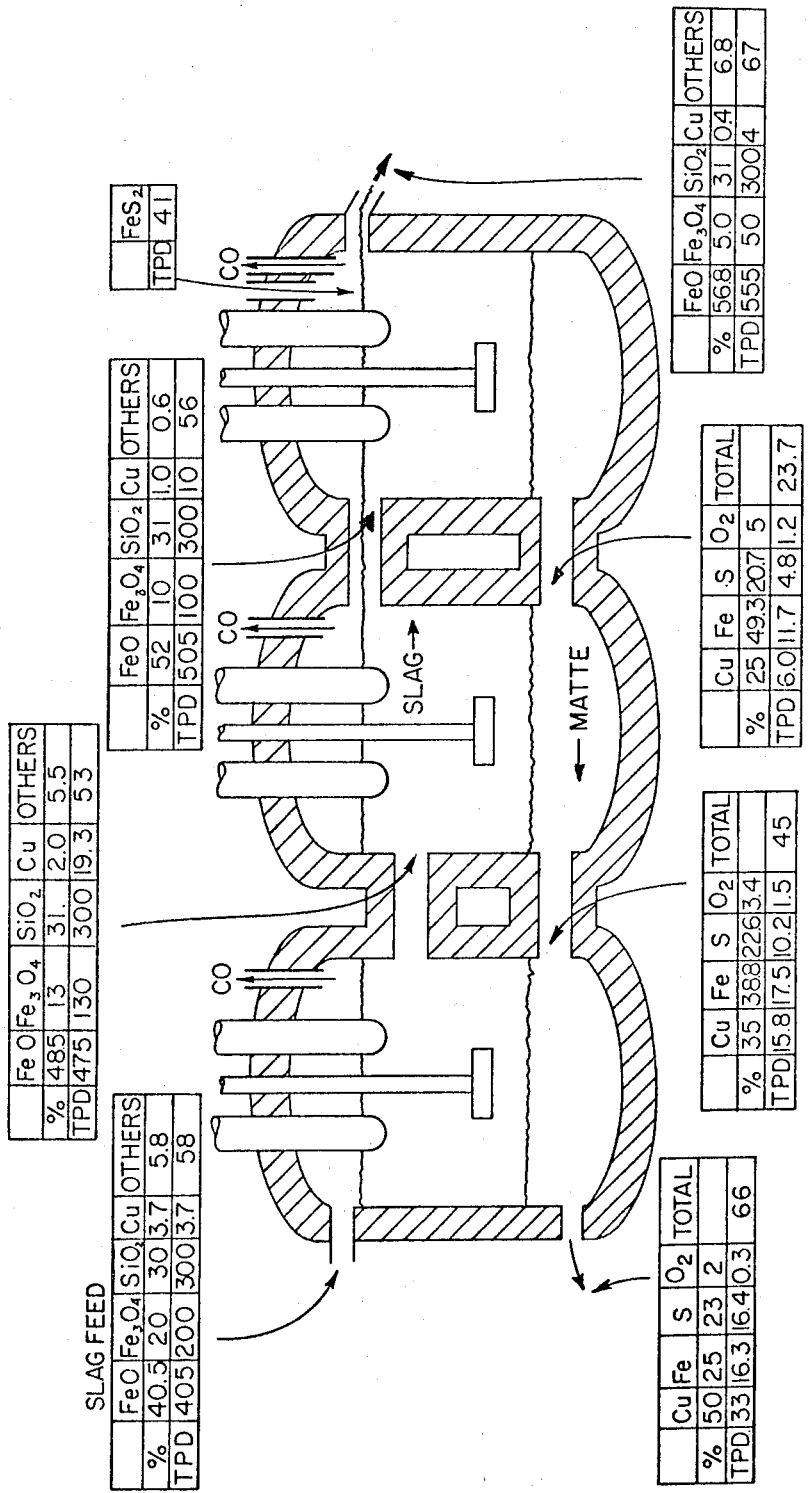
FIG. 10 is a schematic flow sheet for a three stage reactor in accordance with the present invention.

Material and energy balances relating to the treatment of slag in two stage and three stage reactors in accordance with the present invention is set forth in FIG. 9 and 10. For the embodiments of the invention illustrated in FIGS. 9 and 10, the temperature of the system during treatment is approximately 1250°C and the speed of the stirrer during coal and pyrite addition is approximately 250 rpm. In each case, an amount of coal is added to each reactor to reduce the magnetite content of the slag to about 8 percent by weight or lower. The amount of coal added, of course, varies and is controlled by the stoichiometry of the system and the carbon content of the coal.

By following the teachings of the present invention, it is possible to treat high magnetite slags pyrometallurgically to recover copper and molybdenum. By reducing the magnetite content of the slags, copper can be extracted efficiently into a copper matte. Treatment in accordance with the present invention can be accomplished in single or multistage furnaces. One advantage of utilizing a multistage reactor is to insure that the copper content of the slag is as low as possible. In accordance with the present invention, the amount of copper in a converter type slag can be reduced to 0.5 percent by weight. The decopperized slag can be further treated to extract molybdenum values therefrom. Experiments conducted in accordance with the present invention indicate that copper reduction rates closely follow magnetite reduction rates. Pyrite washing of reduced converter slags is very effective for cleaning the slag to reduce the copper content to only 0.4 to 0.6 percent. Most importantly, however, the experiments conducted in accordance with the present invention indicated that the stirred reactor furnace accelerates the rate of magnetite reduction and coalescence as well as the efficiency of copper settling. Thus, an important aspect of the present invention is that the furnace reactor is stirred. In the case of the reduction of iron oxide, ($Fe_3O_4$ and FeO), and non-ferrous metal values (such as copper, molybdenum, nickel and cobalt oxides) contained in slag with particulate carbonaceous materials (coal, coke, et.), since the carbonaceous materials are of lower density (1 to 2 gm/cc) than molten slag (ca 3 gms/cc), the former floats on the surface of the slag and chemical reactions between the two materials is slow. In addition, when iron oxide reacts with carbon at the high temperatures of molten slags, a gaseous product (CO or $CO_2$) is formed which tends to decrease the contact between the carbon and the slag. Furthermore, molten slag does not normally "wet" carbonaceous materials and there is poor contact. Thus, for conducting chemical reduction in this system, it is important that the stirrer "pump" the carbon solids from the surface, down into the molten slag. In principle, this is blending solids into a liquid. This is effectively done by creating a vortex such that the "light" solids are brought into contact with the stirrer blades and "thrown" radially into the molten material. The stirrer may have a large blade relative to the containment vessel, or a small one. In the former case, a slow speed is needed to achieve the desired conditions, and in the latter, a higher speed of rotation is required. The stirrer may be centered in the vessel, or brought in on an angle.

A key advantage to the mechanical stirrer is that the solid carbon, which when submerged into the molten slag floats back to the surface, can be pumped back through the melt a number of times until it is efficiently consumed in the chemical reactions. Until the present invention, no device was known which could accomplish such pumping.

In the case of extraction of metal values (such as copper, molybdenum, nickel and cobalt) from molten slag into a molten sulfide matte, it is important to promote interfacial contact between the two immiscible phases (slag and matte or metal). The mechanical stirrer is thus designed to disperse the matte or metal phase into the slag. A vortex at the surface is not required.

The agitator may be axially located in the furnace, or enter from the side, or at an angle; however, the location of the stirrer blades depends on the geometry of the slag and matte phases. Typically, the blade assembly diameter is ⅓ of the reactor diameter, or less, and the blades are immersed ⅔ of the slag depth. As the blade size diminishes, the speed must be increased to provide sufficient energy to promote interfacial contact.

From the foregoing, it should be clear to those skilled in this art that a high magnetite slag can be efficiently processed to produce a high percentage copper product by mixing a reductant into the slag with a mechanical stirrer which physically beats or blends the reductant into the molten slag. Thus, the broadest aspect of the invention is to extract copper from the slag by mixing a reductant into it to reduce the magnetite content of the slag and to reduce copper oxide in the slag. With the foregoing reduction, copper will settle to the bottom of the reactor and may be extracted as a high grade copper product or phase. It is not essential to utilize a sulfide to extract copper or form a matte in accordance with the present invention; however, utilizing a sulfide extractant and resulting matte is advantageous.

With regard to the flow of slag and product phases and the number of furnace reactors, many options are possible in accordance with the present invention. For example, with a single stage reactor, the slag may be reduced by mixing a carbon containing reductant into it and a copper product phase can be extracted from the bottom of the reactor. As set forth above, a sulfide extractant and matte may be advantageously employed in the single stage reactor in addition to the carbon containing extractant. In this embodiment of the invention, iron pyrites can be added to the reactor along with the carbonaceous reductant. The foregoing will result in the formation of a copper containing sulfide matte which may be drawn off from the bottom of the single stage reactor.

When two reactors are connected in series, as is shown diagrammatically in FIG. 9, coal or coke may be the only material added to the slag in reactor 50 with coal or coke, as well as iron pyrite or copper concentrate, being added to the slag in the second reactor or stage 52. In the embodiment shown in FIG. 9, the slag phase flows countercurrent to the copper phase and is extracted from reactor 50 via outlet 54. It is also possible to extract the copper phase from the bottom of reactor 52, in which case there will be no countercurrent flow of copper and slag. In yet another embodiment of the invention, the copper phase is extracted from both reactors 54 and 52. In all embodiments of the invention, it is most desirable to maintain a reducing atmosphere which is easily accomplished by maintaining a cover of coal or coke over the slag phase.

The options described above with regard to a single stage and two stage reactor are also possible in a three stage or more than three stage reactor. In the embodiment shown in FIG. 1, the slag and matte flow countercurrent to each other. Of course, the matte can be extracted from any of reactors 12, 14 and 16, as well as from any two or all three of these reactors. It is preferred to add pyrite or copper concentrate to the last reactor that the slag flows into a multistage system; however, pyrite or copper concentrates may be added to any number of, or all of the reactors in the process. Of course, as set forth above, improved results over the prior art are derived from utilizing the present invention without the addition of pyrite or copper concentrate. The foregoing is true in a multistage, as well as a single stage reactor.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for extracting copper values from a copper-bearing slag comprising the steps of:
   a. selecting a slag which in addition to copper contains about 7–30 weight percent magnetite, 36–49 weight percent total iron and at least 20 weight percent silica;
   b. introducing the slag into a reactor;
   c. maintaining the temperature of the slag in the reactor at a level at which the slag is molten;
   d. adding a solid carbonaceous reductant to the slag in the reactor, the amount of reductant being sufficient to lower the oxygen potential of the slag to a level at which a copper bearing phase separates from the slag;
   e. mixing the reductant into the slag in the reactor, while the slag is molten, with a liquid cooled, metal bladed, mechanical, rotating stirrer to reduce the slag, said stirrer being rotated at a speed sufficient to pump said reductant into the slag and keep it submerged in the slag long enough for it to decrease the oxygen potential and lower the soluble copper content of the slag to enable the formation of a copper bearing phase; and
   f. separating a copper bearing phase from the slag.

2. The process as set forth in claim 1 wherein in step (d) a member selected from the group consisting of coke and coal is added to the slag.

3. The process as set forth in claim 1 also including the step of contacting the slag with a sulfide extractant to extract copper values remaining in the slag after it has been reduced in step (e).

4. The process as set forth in claim 3 wherein the copper bearing phase is separated from the slag in a sulfide matte.

5. The process as set forth in claim 1 wherein the temperature of the slag during the mixing which takes place in step (e) is maintained between the range of 1200°C – 1250°C.

6. The process as set forth in claim 1 wherein a slag having the following composition is selected:

| Constituent | Amount in % by Weight |
| --- | --- |
| Copper | 4 – 3 |
| Silica | 20 – 29 |
| Iron-Total | 46 – 49 |
| Magnetite | 20 – 25. |

7. The process as set forth in claim 1 wherein a slag having the following composition is selected:

| Constituent | Amount in % by Weight |
| --- | --- |
| Copper | 1 – 1.5 |
| Silica | 29 – 30 |
| Iron-Total | 44 – 46 |
| Magnetite | 10 – 13. |

8. The process as set forth in claim 1 wherein a slag having the following composition is selected:

| Constituent | Amount in % by Weight |
| --- | --- |
| Copper | 12 |
| Silica | 22 – 24 |
| Iron-Total | 36 |
| Magnetite | 20 – 25 |
| Sulfur | 1. |

9. A process for extracting copper values from a copper-bearing slag comprising the steps of:
   a. selecting a slag which in addition to copper contains about 7–30 weight percent magnetite, 36–49 weight percent total iron and at least 20 weight percent silica;
   b. introducing the slag to be treated into a multistage reactor containing at least two stages and being of the type in which each stage is connected in series so that slag in one stage can flow into another stage;
   c. maintaining the temperature of the slag in the reactor at a level at which the slag is molten;
   d. adding a solid carbonaceous reductant to the slag in at least two stages of the reactor, the amount of reductant being sufficient to lower the oxygen potential of the slag to a level at which a copper bearing phase separates from the slag;
   e. mixing the reductant into the slag in at least two stages of the reactor, while the slag is molten, with a liquid cooled, metal bladed, mechanical, rotating stirrer to reduce the slag, said stirrer being rotated at a speed sufficient to pump said reductant into the slag and keep it submerged in the slag long enough for it to decrease the oxygen potential and lower the soluble copper content of the slag to enable the formation of a copper bearing phase; and
   f. separating the copper bearing phase from the slag.

10. The process as set forth in claim 9 wherein in step (d) a member selected from the group consisting of coke and coal is added to the slag.

11. The process as set forth in claim 9 also including the step of contacting the slag with a sulfide extractant to extract copper values remaining in the slag after it has been reduced in step (e).

12. The process as set forth in claim 11 wherein the copper phase is separated from the slag in the sulfide matte.

13. The process as set forth in claim 9 wherein the temperature of the slag during the mixing which takes place in step (e) is maintained between the range of 1200°C – 1250°C.

14. The process as set forth in claim 9 wherein the slag is introduced into a multistage reactor which is connected in series so that the copper bearing phase which is formed in one stage can flow into another stage separately from the flow of slag from one stage to another and wherein the slag is flowed from stage to stage separately from the flow of the copper bearing phase.

15. The process as set forth in claim 14 wherein the copper bearing phase and slag is flowed from one stage to another in a countercurrent manner.

16. The process as set forth in claim 15 wherein prior to removing the slag from the last stage into which the slag is flowed, the slag is washed with a sulfide to extract copper values remaining in the slag after it has been reduced in step (e) and to form a copper containing sulfide matte.

17. The process as set forth in claim 9 wherein a slag having the following composition is selected:

| Constituent | Amount in % by Weight |
| --- | --- |
| Copper | 4 – 3 |
| Silica | 20 – 29 |
| Iron-Total | 46 – 49 |
| Magnetite | 20 – 25. |

18. The process as set forth in claim 9 wherein a slag having the following composition is selected:

| Constituent | Amount in % by Weight |
| --- | --- |
| Copper | 1 – 1.5 |
| Silica | 29 – 30 |
| Iron-Total | 44 – 46 |
| Magnetite | 10 – 13. |

19. The process as set forth in claim 9 wherein a slag having the following composition is selected:

| Constituent | Amount in % by Weight |
| --- | --- |
| Copper | 12 |
| Silica | 12 – 24 |
| Iron-Total | 36 |
| Magnetite | 20 – 25 |
| Sulfur | 1. |

* * * * *